Patented Oct. 25, 1927.

1,647,021

UNITED STATES PATENT OFFICE.

ERWIN A. SCHUMACHER, OF BROOKLYN, NEW YORK, ASSIGNOR TO NATIONAL CARBON COMAPNY, INC., A CORPORATION OF NEW YORK.

ELECTROLYTE SEAL AND PROCESS OF MAKING THE SAME.

No Drawing.    Application filed October 16, 1923.    Serial No. 668,946.

This invention relates to improvements in seals adapted to be applied to the electrolyte of galvanic cells. The principal object of the invention is to provide an effective non-fluid seal capable of preventing evaporation and entry of atmospheric gases, but permeable by gases generated in the cell. In the preferred form of the present process, as applied to cells having an alkaline electrolyte, the seal is formed by causing a saponifiable oil or fat to react with the electrolyte to form a layer of a soap.

According to present practice, the caustic solution of copper oxid cells or the like is covered with a layer of a mineral oil which is non-reactive with the solution. This is in general satisfactory so far as excluding carbon dioxid and preventing evaporation are concerned. However, in many cases it would be desirable to have a rigid or semi-rigid seal instead of a layer of a fluid oil. This is especially the case in cells of the "dry" type, in which a gelatinous electrolyte is used. One of the important advantages of such cells is that they may be handled freely without danger of spilling the electrolyte and this advantage is minimized by the necessity for careful handling to prevent the displacement of the liquid seal.

I have discovered that an effective and convenient non-liquid seal may be obtained by applying a layer of a soap upon the surface of the electrolyte. The seal is preferably formed by pouring upon the electrolyte a thin layer of a saponifiable oil. Reaction takes place at room temperature and is usually complete within a few hours. Heating may of course be resorted to if it is desired to expedite the formation of the seal.

The soap seal produced by the method described is sufficiently strong and rigid to prevent fluctuations of fluid electrolyte, under ordinary conditions, and securely retains electrolyte carried by an absorbent or in gelatinous condition. The seal has the desired protective action upon the electrolyte, but allows cell gases to escape.

Vegetable oils, such as cotton seed oil or the like, are particularly suitable, but any saponifiable oil or fat which will form a soap of the proper character may be used.

Only a relatively small amount of alkali is fixed by reaction with the oil. If desired, however, the alkali content of the standard electrolyte may be increased to supply such additional alkali as may be necessary.

While the seal is especially adapted for galvanic cells, in some cases it may be desirable to apply it to a body of caustic solution which is to be used for electrolyte, or for other purposes requiring caustic free from contamination by carbon dioxid.

It is within the scope of the invention to form the soap layer in other ways than that described, as, for example, by melting the soap or dissolving it in a volatile solvent, and then pouring it upon the electrolyte. When a method such as this is used, the seal may obviously be applied to electrolyte of any kind upon which the soap layer may be superposed and in which it is relatively permanent. Alkali metal soaps are preferred but in some cases soaps of the heavier metals may be used.

Various changes may be made in the preferred form of the invention herein described within the scope of the appended claims.

I claim:

1. Process of sealing liquids to prevent evaporation and contamination by gases, comprising covering the solution with a non-fluent layer of a soap.

2. Process according to claim 1, in which the soap layer is formed by reaction in situ.

3. Process of sealing the electrolyte of galvanic cells having gelatinous caustic electrolyte, comprising placing a saponifiable material upon the surface of the electrolyte, whereby a layer of a soap is formed thereon.

4. Process of forming a seal upon gelatinous caustic electrolyte, comprising applying a saponifiable oil to the surface of the electrolyte, whereby a layer of a soap is formed thereon.

5. Process of sealing the electrolyte of galvanic cells, comprising reacting upon the electrolyte with a material adapted to form a distinct non-fluent layer at the surface thereof.

6. In a galvanic cell, an electrolyte seal comprising a layer of a soap.

7. In a galvanic cell, caustic electrolyte and a seal therefor comprising a layer of an alkali metal soap.

8. In a galvanic cell, gelatinous caustic electrolyte sealed with the reaction product of the caustic and a saponifiable oil.

In testimony whereof, I affix my signature.

ERWIN A. SCHUMACHER.